United States Patent
Feilner et al.

(10) Patent No.: US 11,451,910 B2
(45) Date of Patent: Sep. 20, 2022

(54) PAIRING OF HEARING DEVICES WITH MACHINE LEARNING ALGORITHM

(71) Applicant: SONOVA AG, Staefa (CH)

(72) Inventors: Manuela Feilner, Egg b. Zürich (CH); Arnaud Brielmann, Le Landeron (CH); Amre El-Hoiydi, Neuchâtel (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 17/175,185

(22) Filed: Feb. 12, 2021

(65) Prior Publication Data

US 2021/0258704 A1 Aug. 19, 2021

(30) Foreign Application Priority Data

Feb. 13, 2020 (EP) .................................. 20157251

(51) Int. Cl.
H04R 25/00 (2006.01)
H04W 4/70 (2018.01)
(Continued)

(52) U.S. Cl.
CPC ........... *H04R 25/554* (2013.01); *G06N 20/00* (2019.01); *H04W 4/70* (2018.02); *H04W 4/80* (2018.02); *H04R 2225/55* (2013.01)

(58) Field of Classification Search
CPC ...... G06N 20/00; H04R 25/43; H04R 25/554; H04R 2225/55; H04W 4/02; H04W 4/027; H04W 4/33; H04W 4/70; H04W 4/80

(Continued)

(56) References Cited

U.S. PATENT DOCUMENTS 9,544,698 B2  1/2017 Kaulberg et al.
10,129,663 B2  11/2018 Jensen et al.
(Continued)

FOREIGN PATENT DOCUMENTS

EP 1691573 8/2006
EP 1576852 10/2009
(Continued)

OTHER PUBLICATIONS

Anemuller,J. "A Discriminative Learning Approach to Probabilistic Acoustic Source Localization", 14th International Workshop on Acoustic Signal Enhancement (IWAENC), Conference Paper, Sep. 2014. DOI: 10.1109/IWAENC.2014.6953346.
(Continued)

*Primary Examiner* — Harry S Hong
(74) *Attorney, Agent, or Firm* — ALG Intellectual Property, LLC

(57) ABSTRACT

An illustrative method is disclosed for determining potential partner devices for a hearing device worn by a user, wherein the hearing device is adapted for establishing a data communication connection with other devices with a data communication interface and for receiving an audio data stream from the other devices via the data communication interface. The method includes generating context data from sensor data recorded by the hearing device; inputting the context data into a machine learning algorithm, which has been trained with historical context data to classify potential partner devices; and outputting at least one classification by the machine learning algorithm, the classification classifying the potential partner devices and indicating whether the user expects a data communication connection with the potential partner devices.

14 Claims, 2 Drawing Sheets

(51) Int. Cl.
*G06N 20/00* (2019.01)
*H04W 4/80* (2018.01)

(58) Field of Classification Search
USPC .......................................................... 381/315
See application file for complete search history.

(56) References Cited

U.S. PATENT DOCUMENTS

| | | | |
|---|---|---|---|
| 2012/0195449 A1* | 8/2012 | Thiede | H04R 25/558 |
| | | | 381/315 |
| 2012/0321112 A1 | 12/2012 | Schubert | |
| 2017/0055108 A1 | 2/2017 | Jeon | |
| 2017/0188173 A1 | 6/2017 | Ranieri et al. | |
| 2017/0208639 A1 | 7/2017 | Lee et al. | |
| 2017/0311092 A1 | 10/2017 | Segall | |
| 2018/0115858 A1 | 4/2018 | Raghavendra | |
| 2018/0184152 A1 | 6/2018 | Kirkpatrick et al. | |
| 2018/0270592 A1 | 9/2018 | Linsky et al. | |
| 2019/0230450 A1* | 7/2019 | Aase | H04R 25/55 |

FOREIGN PATENT DOCUMENTS

| | | |
|---|---|---|
| EP | 2899996 | 7/2017 |
| WO | 2008071236 | 6/2008 |
| WO | 2018063488 | 4/2018 |

OTHER PUBLICATIONS

Busboom, "Unambiguous Device Identification and Fast Connection Setup in Bluetooth", Aachen University of Technology, Communication Networks. Jan. 2002.

Chartcross Limited, "GPS Test, https://play.google.com/store/apps/details?id=com.chartcross.gpstest." As accessed on Feb. 26, 2021.

Hochreiter,S., "Long Short-Term Memory", Neural Computation, 9(8): 1735-1780, 1997.

Taylor,L., "Improving Deep Learning Using Generic Data Augmentation", arXiv:1708.06020v1 [cs.LG] Aug. 20, 2017.

Wikipedia, "Recurrent Neural Network", Wikipedia—https://en.wikipedia.org/wiki/Recurrent_neural_network, as accessed on Feb. 26, 2021.

Extended European Search Report received in EP Application No. 20157251.8 dated Aug. 11, 2020.

* cited by examiner

PAIRING OF HEARING DEVICES WITH MACHINE LEARNING ALGORITHM

RELATED APPLICATIONS

The present application claims priority to EP Patent Application No. 20157251.8, filed Feb. 13, 2020, the contents of which are hereby incorporated by reference in their entirety.

BACKGROUND INFORMATION

Hearing devices are generally small and complex devices. Hearing devices can include a processor, microphone, speaker, memory, housing, and other electronical and mechanical components. Some example hearing devices are Behind-The-Ear (BTE), Receiver-In-Canal (RIC), In-The-Ear (ITE), Completely-In-Canal (CIC), and Invisible-In-The-Canal (IIC) devices. A user can prefer one of these hearing devices compared to another device based on hearing loss, aesthetic preferences, lifestyle needs, and/or budget.

Some hearing devices offer the possibility to connect to other devices via a wireless data communication connection. With such a data, communication and audio stream may be sent from the hearing device to a partner device and/or from the partner device to the hearing device. For example, when such a data communication connection is established between two hearing devices, the hearing devices may be used as headsets which pick-up the users' voice with their integrated microphones and make the communication participants voice audible via the integrated speakers.

Such a data communication connection is usually established manually. However, for a user it may be difficult to know, when such a connection may be beneficial to activate. The user also may forget to use the data communication connection. It also may be cumbersome to activate the data communication connection again and again in the same situation. It also may be very disturbing, when a user forgets to deactivate the data communication connection in a situation, where he wants to maintain his privacy and he is not aware that he is heard by others.

In US 2017311092A1, an automatic pairing between hearing devices is mentioned.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
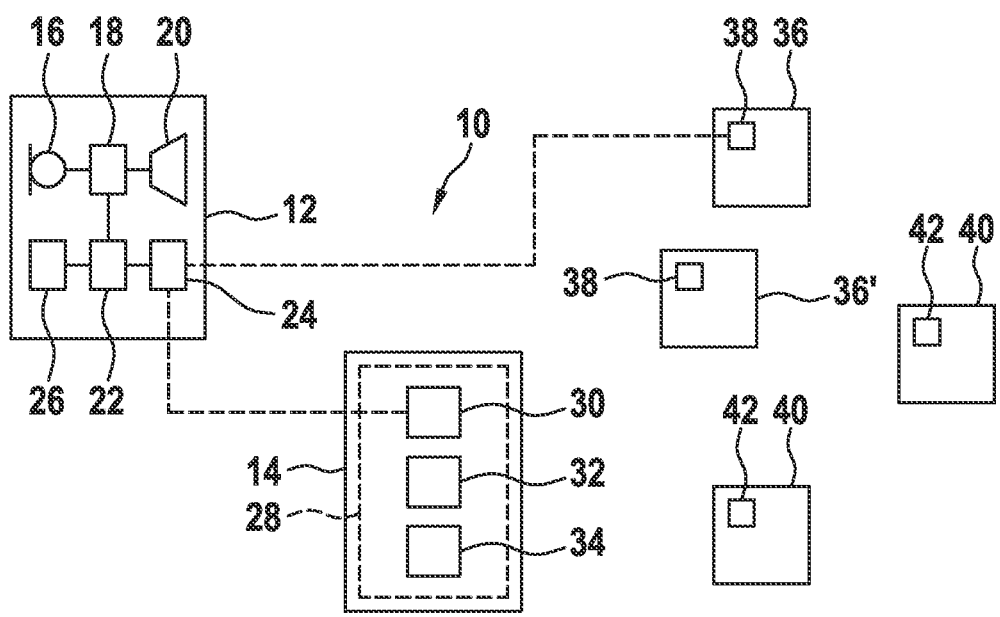
FIG. 1 schematically shows a hearing system according to an embodiment.

Described herein are a method, a computer program and a computer-readable medium for determining partner devices for a hearing device worn by a user. Furthermore, the embodiments described herein relate to a hearing system.

Embodiments described herein simplify the pairing of a hearing device with a partner device for a user.

These embodiments are achieved by the subject-matter of the independent claims. Further exemplary embodiments are evident from the dependent claims and the following description.

A first aspect relates to a method for determining partner devices for a hearing device worn by a user. The hearing device may be a hearing aid for compensating a hearing loss of a user. Here and in the following, when to a hearing device is referred, also a pair of hearing devices, i.e. a hearing device for each ear of the user, may be meant.

The hearing device is adapted for establishing a data communication connection with other devices with a data communication interface and for receiving an audio data stream from the other devices via the data communication interface. One or more of the other devices may be paired with the hearing device via a data communication connection. The data communication connection, which may be a wireless connection, may be established via any wireless protocol, such as Bluetooth.

A communication interface may comprise a sender/receiver for wireless data communication, for example via radio emission.

A partner device may be any device adapted for establishing a data communication connection with the hearing device. A partner device may be a device, which may be paired with the hearing device. The partner device also may comprise a data communication interface. The partner device may be a hearing device, a mobile device, a microphone, a TV set, etc.

According to an embodiment, the method comprises: generating context data from sensor data recorded by the hearing device. The hearing device and optionally a connected partner device and/or mobile device may comprise one or more sensors, such as a microphone, the receiver of the communication interface, a position sensor, etc., which may be used for determining a context of the user. The context of the user may define the actual situation, the user is in. This context and/or situation may depend on the position and/or location of the user, its environment, the current time, and/or other persons with specific devices around the user. The context may be determined from sensor data and may be encoded with context data.

It also may be that sensor data from other devices is received in the hearing device and evaluated for generating context data.

According to an embodiment, the method further comprises: inputting the context data into a machine learning algorithm, which has been trained with historical context data to classify the potential partner devices; and outputting at least one classification by the machine learning algorithm, the classification classifying the potential partner devices, whether the user expects to establish a data communication connection with them. The classification may be and/or may comprise one or more classification values, such as probabilities. The machine learning algorithm may be seen as a classifier generating the classification.

The machine learning algorithm may comprise a neuronal network, a statistical method and/or a support vector machine. In general, the machine learning algorithm may be based on a function, which has input data in form of the context data and which outputs the classification. The function comprises weights, which can be adjusted during training. During training, historical data or training data, i.e. historical context data and corresponding historical classifications are used for adjusting the weights. It has to be noted that the training also may take place during the usage of the hearing device, when a user manually selects a partner device and training data may be generated in this way.

The classification may comprise one or more values and/or probabilities classifying partner devices and/or sets of partner devices. In a simple case, the classification may comprise a positive value for a potential partner device, where a connection in the present context is advised and a negative value for a potential partner, where a connection in the present context is refused. As a further example, a list of possible partner devices may be generated.

When the classification has been determined, a data communication connection, to which the user is likely to connect to, may be established automatically, and/or the user at least may be informed about the advised data communication connection. It also may be that data communication connections, which are currently established, are automatically disconnected, when the classification for the respective device indicates that no connection is wished. Also in the latter case, the user may be at least informed that the data connection should be disconnected.

This all may help the user of the hearing device to connect to and/or disconnect from the data communication connections, which are beneficial or disadvantageous in the respective context.

It also is possible to minimizing a power consumption of the hearing device and/or a delay, when searching for partner devices. For example, Bluetooth paging may be a slow and power hungry process. Since the hearing device may support several Bluetooth pairing entries and simultaneous connections to multiple partner devices, the hearing device may page only specific partner devices in specific contexts. For example, the hearing device may try to connect to the user's mobile device directly after boot but to the workplace computer only when arriving into the office. In other words, the list of potential partner devices may be restricted based on the context data and the classification.

Such a strategy may both minimize the power consumption cost of searching for partner devices and may minimize the time needed to connect to the wanted partner device.

According to an embodiment, the context data comprises position data, which is determined with an accelerometer of the hearing device. With the accelerometer, a head orientation of the user may be determined. Such a head orientation may be combined with context data encoding sound sources in the environment of the user.

According to an embodiment, the context data comprises position data, which is determined with a position sensor of a mobile device in data communication with the hearing device. For example, the position sensor may be a GPS sensor and from the GPS position, the current location of the user may be determined, such as his house, his office, a restaurant, etc. The mobile device may be a mobile phone carried by the user.

According to an embodiment, position data of the hearing device is estimated from connection data of detected other devices, which have been detected with the data communication interface, and included into the context data. For example, distances and/or distance changes to other devices, which may be determined with the data communication interface, may be estimated.

According to an embodiment, from position data, a position of the user is classified into at least two position classes and the position classes are included into the context data. For example, from a strength of a GPS signal, the position of the user may be divided into "indoor" and "outdoor".

According to an embodiment, the context data comprises an actual time. The current time may be used as defining the context of the user. It may be that the current time is coarsen to longer time intervals, such as hours or daytimes. The actual time may comprise a day time, a date and/or a week day.

According to an embodiment, the context data comprises actual user settings of the hearing device. Such user settings may comprise the current volume, selected programs, selected modes, etc. User settings also may define the context of the user.

According to an embodiment, the method comprises: detecting potential partner devices in an environment of the hearing device via the data communication connection and generating metadata for each detected potential partner device. Many wireless protocols offer the possibility to determined potential communication partners for a device. For example, the communication interface of a device may regularly send data, which identifies the device. Such broadcasted data may be received by the hearing device and evaluated. The metadata generated may contain such identifying data and/or an identifier for the respective potential partner device.

The metadata may be additionally input into the machine learning algorithm, which has been trained additionally with historical metadata to classify the potential partner devices. The classification output by the machine learning algorithm may then classify the detected potential partner devices, whether the user expects a data communication connection with them or not.

According to an embodiment, an audio stream classification is determined from an audio stream generated by a microphone of the hearing device and is included into the context data. The hearing device may comprise one or more audio classification modules, which output a classification value for the audio stream generated by the microphone. Such a classification may comprise information about the type of sound received, such as speech or music, about the sound environment, such as loud, noise, calm, about the numbers of persons around the user, etc. This audio stream classification also may be input into the machine learning algorithm.

According to an embodiment, an audio stream classification is determined from an audio stream received via the data communication interface and included into the context data. The same classification also may be performed with an audio stream received via a data communication connection, for example, from the mobile device.

According to an embodiment, the machine learning algorithm is composed of at least two subunits; wherein each subunit receives the metadata and at least a part of the context data and outputs an intermediate classification, on which the classification of the machine learning algorithm is based. Each of the subunits may be a machine learning algorithm of its own, which may be trained independently from the other one. It may be that the context data is divided into several parts, which are input into different subunits. It also may be that some subunits receive the same context data.

The intermediated classification may be input into a decision tree, which outputs the final classification.

The subunits may be based on different types of machine learning algorithm. One subunit may comprise an artificial neuronal network, while another subunit may comprise a support vector machine.

According to an embodiment, one, first subunit is executed in the hearing device. It also may be that another, second subunit is executed in a mobile device in data communication with the hearing device. For example, the second subunit may support the first subunit, when the mobile device is present to improve the classification.

According to an embodiment, the classification comprises a probability of a desired data connection. The classification may provide probabilities, whether the user wants to establish a data communication connection or not. For example, solely data communication connections with a probability higher as a threshold may be automatically established, while data communication connections with a probability lower than a threshold (which may be different from the other threshold) may be disconnected automatically.

According to an embodiment, the classification comprises an indicator for a desired data communication connection with more than one partner devices. It may be that also combinations of data communication connections are classified. For example, it may be that the user wants to connect to a computer and a radio simultaneously, when he enters a room.

According to an embodiment, the method further comprises: providing the detected partner devices and their classification to the user via a user interface. It also may be that solely the partner devices, which have a probability higher than a threshold, are provided to the user. This may reduce the number of entries a user can select. The user may select a provided partner device, such that the data communication connection is established. The user interface may be a graphical user interface of the mobile device.

It may be that, for example via the user interface, every potential partner device can be tagged for automatic connection and/or for manual connection. The user may select the devices, for which he wants a connection to manage manually and which should be managed automatically.

It also may be that partner devices, which have a probability lower than a threshold and/or which are likely to be disconnected by the user, are provided to the user. The user then may select a provided partner device to end the data communication connection.

According to an embodiment, when a user establishes a data communication connection with a partner device, the machine learning algorithm is trained with actual context data and the metadata of the partner device. The machine learning algorithm may learn during operation of the hearing device. Any time, when the user interferes with an automatic connection and/or disconnection, the machine learning algorithm may be trained. It also may be that the machine learning algorithm is trained, when the user connects and/or disconnects a partner device by selecting it with a user interface.

It may be that the training is done by the mobile device, when then transmits the adjusted weights to the hearing device. This may reduce the computational demands on the hearing device.

A further aspect relates to a method for connecting to and/or disconnecting from a partner device. In the method, a classification for indicating at least one potential partner device of the hearing device is determined, as described above and below. The classification may be used for automatically connecting and/or disconnecting data communication connections.

According to an embodiment, the method comprises: automatically connecting to a partner device, which is classified that the user wants data communication with it. As already mentioned, the hearing device may automatically connect to a partner device, when the machine learning algorithm classifies the partner device accordingly. A graphical user interface may enable the user to select whether he wants the automatic connection and disconnection function or not.

According to an embodiment, the method comprises: when the hearing device is connected for data communication with a partner device not classified as potential partner device, disconnection from the partner device. The hearing device may automatically disconnect from a partner device, when the machine learning algorithm classifies the partner device accordingly. It also may be possibly that the user is allowed to manually establish a connection to devices unknown by the classification. Such devices may then not be disconnected automatically.

Further aspects relate to a computer program for determining partner devices of a hearing device and optionally for connection and disconnection to one of the partner devices, which, when being executed by a processor, is adapted to carry out the steps of the method as described in the above and in the following as well as to a computer-readable medium, in which such a computer program is stored.

For example, the computer program may be executed in a processor of the hearing device. The computer-readable medium may be a memory of this hearing device. The computer program also may be executed by a processor of the mobile device and the computer-readable medium may be a memory of the mobile device. It also may be that steps of the method are performed by the hearing device and other steps of the method are performed by the mobile device.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. The computer-readable medium may be a non-transitory or transitory medium.

Further aspects relate to the hearing device as described above and below and/or to a hearing system comprising such a hearing device. The hearing system optionally may comprise a mobile device as described above and below. The hearing device and/or the hearing system may be adapted for performing the method as described above and below.

It has to be understood that features of the method as described in the above and in the following may be features of the computer program, the computer-readable medium, the hearing device and the hearing system as described in the above and in the following, and vice versa.

These and other aspects will be apparent from and elucidated with reference to the embodiments described hereinafter.

FIG. 1 schematically shows a hearing system 10 with a hearing device 12, which may be a behind-the-ear hearing aid or an in-the-ear hearing aid, and a mobile device 14, such as a smartphone. It has to be noted that the hearing device 12 also may be another type of hearing device, such as a hearable. The hearing device 12 may be carried by a user.

The hearing device 12 comprises a microphone 16, a sound processor 18, which may comprise an amplifier, and a sound output device 20, such as a loudspeaker, also called receiver. The microphone 16 may acquire environmental sound of the user and may generate an audio stream, which is processed by the sound processor 18 and output by the sound output device 20 into the ear of the user.

The hearing device 12 may comprise a processor 22 in combination with a memory, which is adapted for adjusting a sound level pressure and/or frequency-dependent gain of the sound processor 18.

The hearing device 12 furthermore comprises a data communication interface 24, via which the hearing device is adapted for establishing data communication connections, for example to the mobile device 14.

The hearing device 12 also may comprise a position sensor in the form of an accelerometer 26.

The mobile device 14 comprises a graphical user interface 28, which is controlled by a processor 34 in combination with a memory. With a data communication interface 30, the mobile device may establish a data communication connection with the hearing device 12. Via this data communication connection, an audio stream, such that of a telephone call, and other data, for example configuration data, may be sent to the hearing device 12.

The mobile device 14 comprises furthermore a position sensor 32, such as a GPS sensor, which may be used for receiving a GPS signal, which is evaluated by the mobile device 14.

FIG. 1 shows potential partner devices 36, 36', which may be connected to the hearing device 12 for data communication. For example, such devices include other hearing devices, smart microphone, TV sets, computers, digital radios, etc. Each of these potential partner devices 36, 36' comprise a data communication interface 38.

FIG. 1 also shows further devices 40, which have a data communication interface 42, which can be detected by the hearing device 12 with the communication interface 24, but which are not possible communication partners, such as a printer. However, such devices 40 and/or the signal and data broadcasted by them may be used for defining a context of the user.

Figure 2:
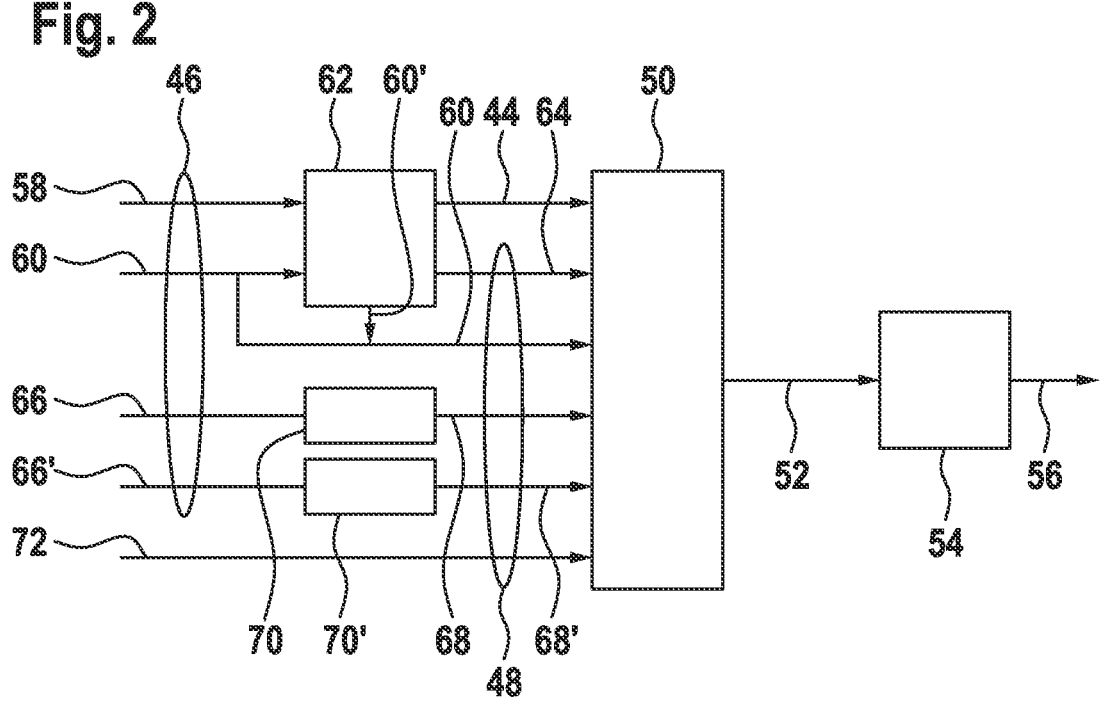
FIG. 2 schematically shows a data flow diagram illustrating a method according to an embodiment.

FIG. 2 schematically shows a data flow diagram, which also illustrates a method for determining the partner devices 36 for the hearing device 12. The method may be performed by the hearing device 12 and optionally the mobile device 14.

It is shown that metadata 44 and context data 48 determined from sensor data 46 is input into a machine learning algorithm 50, which outputs a classification 52. The classification 52 is then optionally received in an actuator 54, which outputs a command 56 for connecting the hearing device 12 to one or more partner devices 36 and/or for disconnecting the hearing device 12 from one or more partner devices 36.

It has to be noted that the boxes shown in FIG. 2 may represent modules of a software run in the hearing device 12 and optionally the mobile device 14. For example, the box 50 also may be a machine learning module and the box 54 also may be an actuator module.

A preprocessor 62 may receive connection data 58 and determines the metadata 44 therefrom. The connection data 58 may be provided by the data communication interface 24, which regularly may scan the environment of the hearing device 12 for potential pairing partners 36, 36'. The data communication interface 24 may detect potential partner devices 36, 36' in an environment of the hearing device 12 and may collect information about them, which is then included into the connection data 58.

The data communication interface 24 also may detect other devices 40, which may have a data communication interface 42 of its own, which generate radio or other communication signals, which may be detected by the data communication interface 24. All this information may be included into the connection data 58.

The metadata 44 may contain information about present potential pairing partners 36, 36', such as unique IDs, names, network addresses, a classification of the potential pairing partners 36 provided by the user, etc.

The preprocessor 62 also may receive position data 60, which may encode a location and/or spatial orientation of the hearing device 12 and/or the mobile device 14. Position data 60 may comprise coordinates, vectors, angles, etc.

The preprocessor 62 may transform the position data 60 into position classes 64, such as "indoor", "outdoor", "in restaurant", etc. In general, a position class 64 may encode a position or more general spatial relationship of the user with the environment with codes. Alternatively and additionally, connection data 58 may be used for determining position classes 64. For example, the presence of a specific device 36, 36', 40 may indicate a specific position of the user.

The position data 60 also may be a part of the context data 48, i.e. the position data 60 may be directly input into the machine learning algorithm 50.

It also may be that the preprocessor 62 transforms the connection data 58 into position data 60'. For example, the distances and/or locations of device 36, 36', 40 may be used for determining position data 60'. It also may be that the connection data 58 is used for determining position data 60'.

For example, the context data 48 comprises position data 60, which is determined with an accelerometer 26 of the hearing device 12. Such position data may encode the body movement of the user and/or the movement of the user and a further person. For example, possible position classes 64 may encode, whether the user is walking, sitting, etc., are the user and the person mirroring their body movements, is the user leaning toward his conversation partner, is the user opening and closing a door, are there transitions between walking, standing and/or sitting, for example, is the user walking away, is the user walking up or downstairs. A detection of walking on stairs can also help to locate the user.

With the position data of the accelerometer 26, also a head position and/or a head movement may be determined as position classes 64: Does the user turn his head toward another potential user? Does the user turn his head away? This analysis may help to estimate the intention of the user to whom he wants to listen to.

It has to be noted that also a correlation of head movements may be correlated with acoustic source location. I.e. an acoustic source location, which may be determined from an audio stream (see below) additionally may be part of the context data 48. In this case, it may be estimated from which direction an acoustic speech signal is arriving to the user. This signal may be correlated with the head movements of the user. This correlation may estimate the probability to whom the user is listening to or which source attracts the attention of the user. This correlation may be made by the pre-processor 62 or by the machine learning algorithm itself.

As a further example, the context data 48 comprises position data 60, which is determined with a position sensor 32 of the mobile device 14 in data communication with the hearing device 12. The position of the user may be determined by GPS data from a smartphone. The position may be retrieved from an external device, such as the smartphone.

As already mentioned, connection data 58 from detected other devices 40, which have been detected with the data communication interface 24, may be used to estimate position data 60' of the hearing device 12. This position data 60' also may be included into the context data 48. For example, information about other users within a communication network, the hearing device 12 and/or the mobile device 14 are a part of, may be evaluated and used for generating position classes 64, such as very close humans e.g. spouse friends, colleagues at work, etc. The relation between the user and other users may be estimated by analysing the connection over time or by manual entry of the user, which indicates the relation family, friends, work.

As a further example, the WiFi state of the mobile phone may be used for determining a position 60' and/or position class 64. A smartphone application may record, whether the WiFi is turned off or on by the user. If the smartphone is connected to a WiFi access point, the SSID may be retrieved and compared to previously connected networks. For example, when the user comes home, his or her smartphone may connect to the home WiFi. The user's hearing device 12 then can try to establish a Bluetooth connection to the home's known Bluetooth devices TV, tablet, etc.

As a further example, the hearing device 12 and/or the mobile device 14 may scan for Bluetooth advertisers and may try to identify devices in the vicinity, such as a workplace laptop, a partner smartwatch, home automation devices, etc. In the case of non-connectable advertising packets, the advertising data may be retrieved and compared to previously seen devices. In the case of advertising events with random address from a device which is bonded to neither the hearing device 12 nor the mobile device 14, the device may be considered un-relevant and therefore filtered out.

It also may be that distances to other devices 36, 36', 40 may be estimated from the connection data 58, for example based on the signal strength of the transmission.

As already mentioned, from the position data 60 and/or the connection data 58, a position of the user may be classified into at least two position classes 64 and the position classes 64 may be included into the context data 48. For example, with the GPS signal, it may be determined whether the user is indoor or outdoor. This may be done based on the signal-to-noise ratio of the satellite signals.

As a further example of context data 48, an audio stream classification 68 may be determined from an audio stream 66 generated by the microphone 16 of the hearing device 12. It also may be that the audio stream classification 68' is determined from an audio stream 66' received via the data communication interface. The audio stream classification 68 may be determined with stream classification modules 70, 70', which already may be present in the hearing device 12. For example, such modules 70, 70' may be used for controlling the operation of the hearing device 12. An example for such a module 70, 70' may be a beam former, a noise estimator, etc.

The audio stream classification 68, 68' determined in these ways may be included into the context data 48.

For example, the audio stream classification 68 may comprise acoustic parameters analysed by the hearing device 12, such as presence of speech, noise floor estimation, speech level of target speaker, signal-to-noise ratio, acoustic source localization, acoustic scene analysis parameters, such as early reflections and the reverberation decay time, which can be used to identify the room.

The audio stream 66' may be analysed with respect to hearing performance quality, such as signal-to-noise ratio, a correlation between stream and acoustic input, etc.

The audio stream classification 68, 68' further may comprise indicators for conversation and speech metrics, such as conversational turns (for example occurrence and temporal history), duration of speech pause, prosody information, conversation content via speech recognition algorithm, etc.

The context data 48 also may comprise user and time data 72, such as an actual time and/or actual user settings of the hearing device. The actual time may comprise a date, a day time, a calendar entry of the user. The date, day time and calendar entry may be read out from an external device, users cloud service, the mobile device 14, etc. Furthermore, user driven setting changes, like the volume and the program of the hearing device 12, may be included into the context data 48. For example, if the user tends to reduce the volume when entering his workplace, this may be an indicator for the machine learning algorithm 50 that the hearing device 12 should try to establish a Bluetooth connection with the user's computer.

After the possible preprocessing by the modules 62, 70, 70', the metadata 44 and the context data 48 are input into the machine learning algorithm 50. The machine learning algorithm has been trained with historical metadata and historical context data to classify the potential partner devices 36, 36'. For example, the machine learning algorithm 50 may comprise an artificial neuronal network, such as a convolutional neuronal network. It may be that the machine learning algorithm 50 comprises other types of trainable algorithm, such as support vector machines, pattern recognition algorithm, statistical algorithm, etc.

Such machine learning algorithms 50 usually are based on weights, which are adjusted during learning.

When a user establishes a data communication connection with a partner device 36, the machine learning algorithm 50 may be trained with actual context data and the metadata of the partner device 36. An algorithm may be used to adapt the weighting while learning from user input, such as that the user has manually chosen another speaker, such as individual behaviours, such as active listening or conversating with a specific subset of individuals. Also, user feedback may be taken as reference data. With the user interface 28, the user can rate, whether he or she is satisfied with an established connection or not.

It may be that the machine learning algorithm is trained before its usage. Data of all characteristics may be recorded in real life situations in diverse scenarios. Those data and the known decision, whether a connection should be established or not, are used for training the machine learning algorithm 50 offline.

The machine learning algorithm, which may be seen as a classifier, outputs at least one classification 52, which classifies the potential partner devices 36, 36', whether the user wants a data communication connection with them or not. The classification 52 may comprise a probability of a desired data connection. The classification 52 comprises an indicator for a desired data connection with one or more partner devices 36.

The classification 52 may comprise a set of connections, the hearing device 12 may try to establish with partner devices 36, 36'. A class may be defined to be such a set of connections. A class may contain connections to several devices 36, 36'. A class may contain no connection to any device. Each connection may be linked to a protocol. A partner device 36, 36' may be connected through different protocols. Each connection may be treated individually. A class may represent multiple environments if the same set of connections are represented in those environments.

As an example, the classification may comprise one or more classes, each of which identifies a connection with a specific device 36, 36'. For each of these classes, also a probability of a desired connection with the specific device 36, 36' may be provided.

In the beginning and/or at factory settings, the machine learning algorithm 50 may be initialized with only one class for the classification 52, which class contains no connection to any device. Every time the user triggers a connection/disconnection or accepts/reject a remote connection request, the training data of the machine learning algorithm 50 may be labeled according to the final connections. If the corresponding class identifying the connection does not exist it may be created.

Several approaches can be considered to overcome the growing number of classes: classes might be removed if not used and the set of connections is already covered by another class. Once the number of classes reaches a defined maximum, the pair of classes which are less distant to each other may be merged.

The classification 52 and/or its classes may be output by a user interface, such as the user interface 28 of the mobile device 14. The detected partner devices 36 and their classification may be provided to the user via the user interface 28. In this case, the user may choose one of the presented classes and the corresponding connection may be established. This user input also may be used for training the machine learning algorithm.

The classification 52 and/or its classes may be input into an actuator module 54 of the hearing device 12, which is adapted for automatically choose one or more classes and establish the corresponding connections. For example, when the probability of a class is higher than a threshold, the actuator module 54 may connect to the partner device 36, which is classified by the class that the user wants data communication with it.

It also may be that the actuator module 54 automatically disconnects connections based on the received classification 52. When the hearing device 12 is connected for data communication with a partner device 36', which is classified by the classification 52 that the user does not want data communication with it, for example, when the corresponding probability is lower than a threshold or when the corresponding class is not present, the actuator module 54 may automatically disconnect the hearing device 12 from the partner device 36'.

Figure 3:
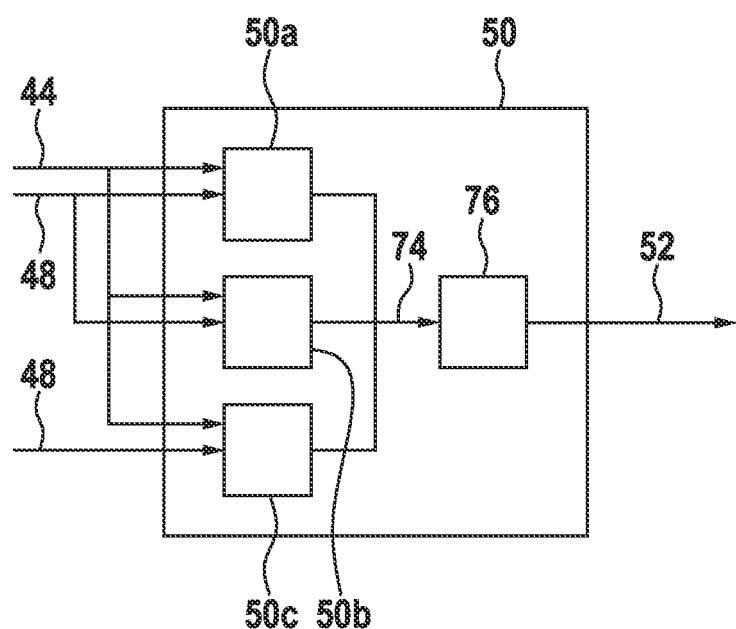
FIG. 3 schematically shows a modular diagram of a machine learning algorithm according to an embodiment.

FIG. 3 shows a possible embodiment of a machine learning algorithm 50, which is composed of subunits composed of subunits 50a, 50b, 50c. Each subunit 50, 50c receives the metadata 44 and at least a part of the context data 48 and outputs an intermediate classification 74, on which the classification 52 of the machine learning algorithm is based.

The subunits 50a, 50b, 50c may be based on different types of machine learning algorithms, such as convolutional neuronal networks, support Vector Machines, pattern recognition algorithms, etc. Some subsets of the context data 48 may be more suitable for one or another algorithm. A decision tree unit in sequence to the subunits 50a, 50b, 50c may be used to make the final decision.

It may be that one subunit, such as 50a, is executed in the hearing device 12 and that another subunit, such as 50b, is executed in a mobile device 14. This may support the quality of the classification 52, when the mobile device 14 is there.

It also may be that for each detected potential partner device 36, 36', a separate subunit 50a, 50b, 50c, such as a separate neural network, may be used instead of one singular machine learning algorithm.

It also may be that the classification 52 for deciding, whether a connection has to be established, may be provided by a first subunit 50a, 50b and that a different classification 52 for deciding, that an existing connection has to be disconnected, is provided by another, second subunit 50c.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 hearing system
12 hearing device
14 mobile device
16 microphone
18 sound processor
20 sound output device
22 processor/memory
24 data communication interface
26 accelerometer
28 graphical user interface
30 data communication interface
32 position sensor
34 processor/memory
36 partner device
38 data communication interface
40 additional device
42 data communication interface
44 metadata
46 sensor data
48 context data
50 machine learning algorithm
52 classification
54 actuator
56 command
58 connection data
60, 60' position data
62 preprocessor
64 position classes
66, 66' audio stream
68, 68' audio stream classification
70, 70' stream classification module
72 user and time data
50a subunit
50b subunit
50c subunit
74 intermediate classification
76 decision tree unit

What is claimed is:

1. A method for determining potential partner devices for a hearing device worn by a user, wherein the hearing device is adapted for establishing a data communication connection with other devices with a data communication interface and for receiving an audio data stream from the other devices via the data communication interface, the method comprising:
- generating context data from sensor data recorded by the hearing device;
- inputting the context data into a machine learning algorithm, which has been trained with historical context data to classify potential partner devices;
- detecting potential partner devices in an environment of the hearing device via the data communication interface and generating metadata for each detected potential partner device, wherein the metadata is additionally input into the machine learning algorithm that has been trained additionally with historical metadata to classify the potential partner devices; and
- outputting at least one classification by the machine learning algorithm, the classification classifying the potential partner devices and indicating whether the user expects a data communication connection with the potential partner devices.

2. The method of claim 1, wherein the context data comprises position data determined with at least one of an accelerometer of the hearing device or a position sensor of a mobile device in data communication with the hearing device.

3. The method of claim 1, wherein from connection data from the other devices, which have been detected with the data communication interface, position data of the hearing device is estimated and included into the context data.

4. The method of claim 1, wherein from position data, a position of the user is classified into at least two position classes and the position classes are included into the context data.

5. The method of claim 1, wherein the context data comprises at least one of an actual time or actual user settings of the hearing device.

6. The method of claim 1,
wherein an audio stream classification is determined from an audio stream generated by a microphone of the hearing device or received via the data communication interface; and
the audio stream classification is included into the context data.

7. The method of claim 1,
wherein the machine learning algorithm is composed of at least two subunits;
wherein each subunit receives at least a part of the context data and outputs an intermediate classification, on which the classification of the machine learning algorithm is based; and/or
wherein the subunits are based on different types of machine learning algorithms.

8. The method of claim 1, wherein the classification comprises at least one of a probability of a desired data connection or an indicator for a desired data connection with more than one partner device.

9. The method of claim 1, further comprising providing the detected partner devices and their classification to the user via a user interface.

10. The method of claim 1, wherein, when the user establishes a data communication connection with a partner device, the machine learning algorithm is trained with actual context data of the partner device and the metadata of the partner device.

11. The method of claim 1, further comprising connecting to a partner device included in the potential partner devices and that is classified that the user wants data communication with the partner device.

12. The method of claim 1, further comprising disconnecting from a partner device included in the potential partner devices and that is classified that the user does not want data communication with the partner device.

13. A non-transitory computer-readable medium storing a computer program for determining partner devices of a hearing device, which, when being executed by a processor, is adapted to carry out the steps of the method of claim 1.

14. A hearing system comprising a hearing device and a mobile device, wherein the hearing system is adapted for performing the method claim 1.

* * * * *